(12) United States Patent
Kidera et al.

(10) Patent No.: US 8,301,424 B2
(45) Date of Patent: Oct. 30, 2012

(54) ROUTE CURVE GENERATION SYSTEM, METHOD AND STORAGE MEDIUM

(75) Inventors: Masayuki Kidera, Kawasaki (JP); Kouji Demizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 12/498,977

(22) Filed: Jul. 7, 2009

(65) Prior Publication Data
US 2009/0276194 A1 Nov. 5, 2009

Related U.S. Application Data

(63) Continuation of application No. PCT/JP2007/001433, filed on Dec. 19, 2007.

(30) Foreign Application Priority Data

Jan. 10, 2007 (WO) .................. PCT/JP2007/050189

(51) Int. Cl.
*G06G 7/48* (2006.01)
*G06G 7/68* (2006.01)
*G06G 7/70* (2006.01)

(52) U.S. Cl. ............................................. 703/6; 703/7

(58) Field of Classification Search ........................ 703/6
See application file for complete search history.

(56) References Cited

U.S. PATENT DOCUMENTS

| | | | |
|---|---|---|---|
| 6,968,289 | B1 | 11/2005 | Tsuchiya et al. |
| 7,308,389 | B2 | 12/2007 | Sawai et al. |
| 2004/0230403 | A1 | 11/2004 | Tsuchiya et al. |
| 2005/0240383 | A1 * | 10/2005 | Hashima et al. .................. 703/7 |

FOREIGN PATENT DOCUMENTS

| | | |
|---|---|---|
| JP | 7-85110 | 3/1995 |
| JP | 2000-284130 | 10/2000 |
| JP | 2004-127925 | 4/2004 |
| JP | 2004-172088 | 6/2004 |
| JP | 2004-362191 | 12/2004 |
| JP | 2005-100913 | 4/2005 |
| WO | 2004/104868 A1 | 12/2004 |

OTHER PUBLICATIONS

Moll et al. "Path Planning for Deformable Linear Objects" IEEE Transactions on Robotics, vol. 22, No. 4, Aug. 2006, pp. 625-636.*
Mittal et al. "Three-Dimensional Offline Path Planning for UAVs Using Multiobjective Evolutionary Algorithms", IEEE, 2007, pp. 3195-3202.*
Galvez et al. "Bezier Curve and Surface Fitting of 3D Point Clouds Through Genetic Algorithms, Functional Networks and Least-Squares Approximation", 2007, ICCSA 2007, LNCS 4706, Part II, pp. 680-693.*
International Search Report for International Application No. PCT/JP2007/050189, mailed Feb. 20, 2007.

* cited by examiner

*Primary Examiner* — Suzanne Lo
(74) *Attorney, Agent, or Firm* — Fujitsu Patent Center

(57) ABSTRACT

Control points needed to generate a curve becoming the route of a deformable linear structure from respective pieces of passing point information defined at two passing points are arranged and the initial arrangement of control points needed to generate a curve is determined by performing re-arrangement of the control points, on the basis of a positional relation between the control points thus arranged. The curve between two points is re-generated from the initial arrangement thus determined while modifying the arrangement of one or more control points, the re-generated curves are then evaluated and a curve meeting a predetermined condition is extracted from among the curves.

11 Claims, 11 Drawing Sheets

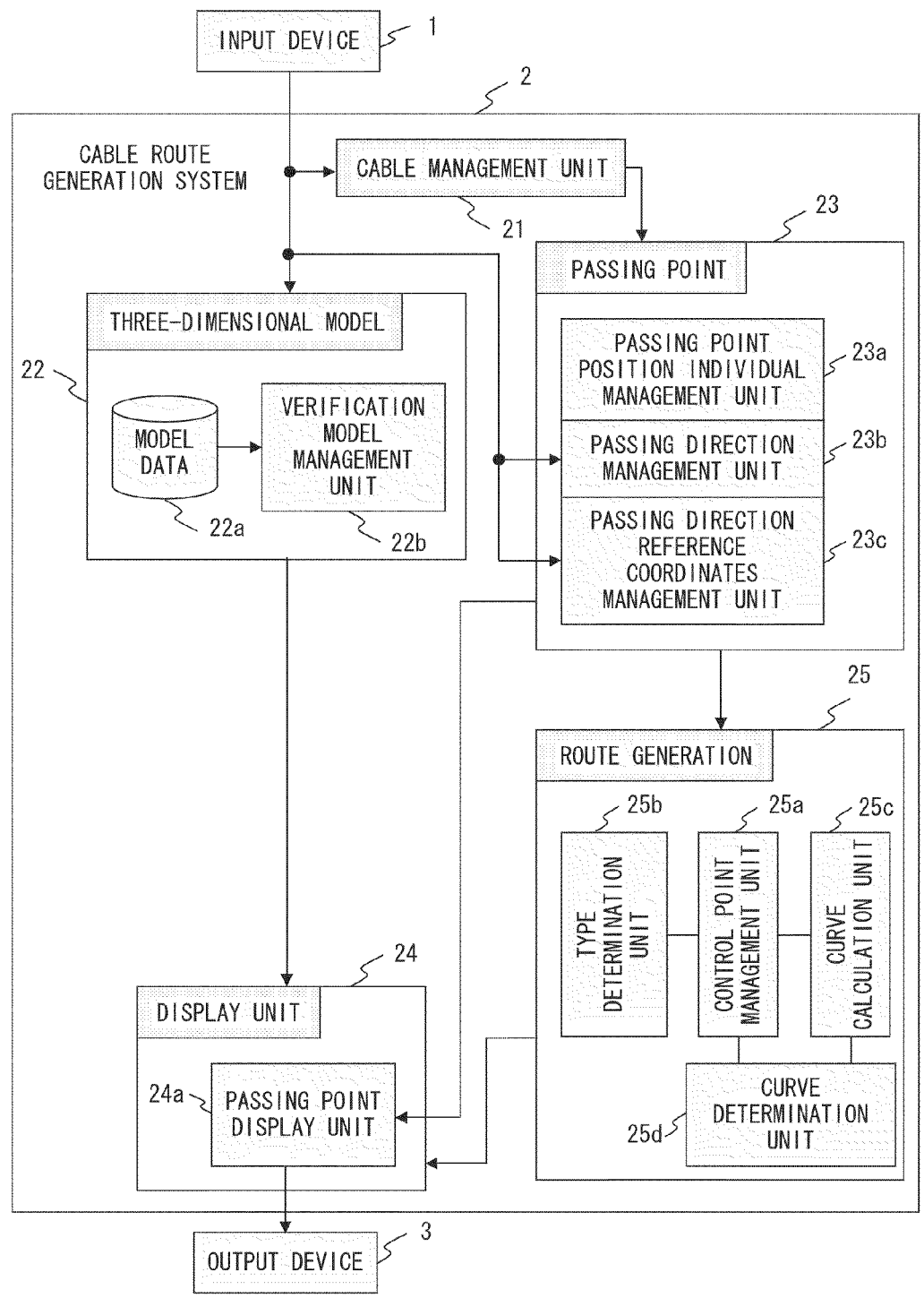
F I G. 8

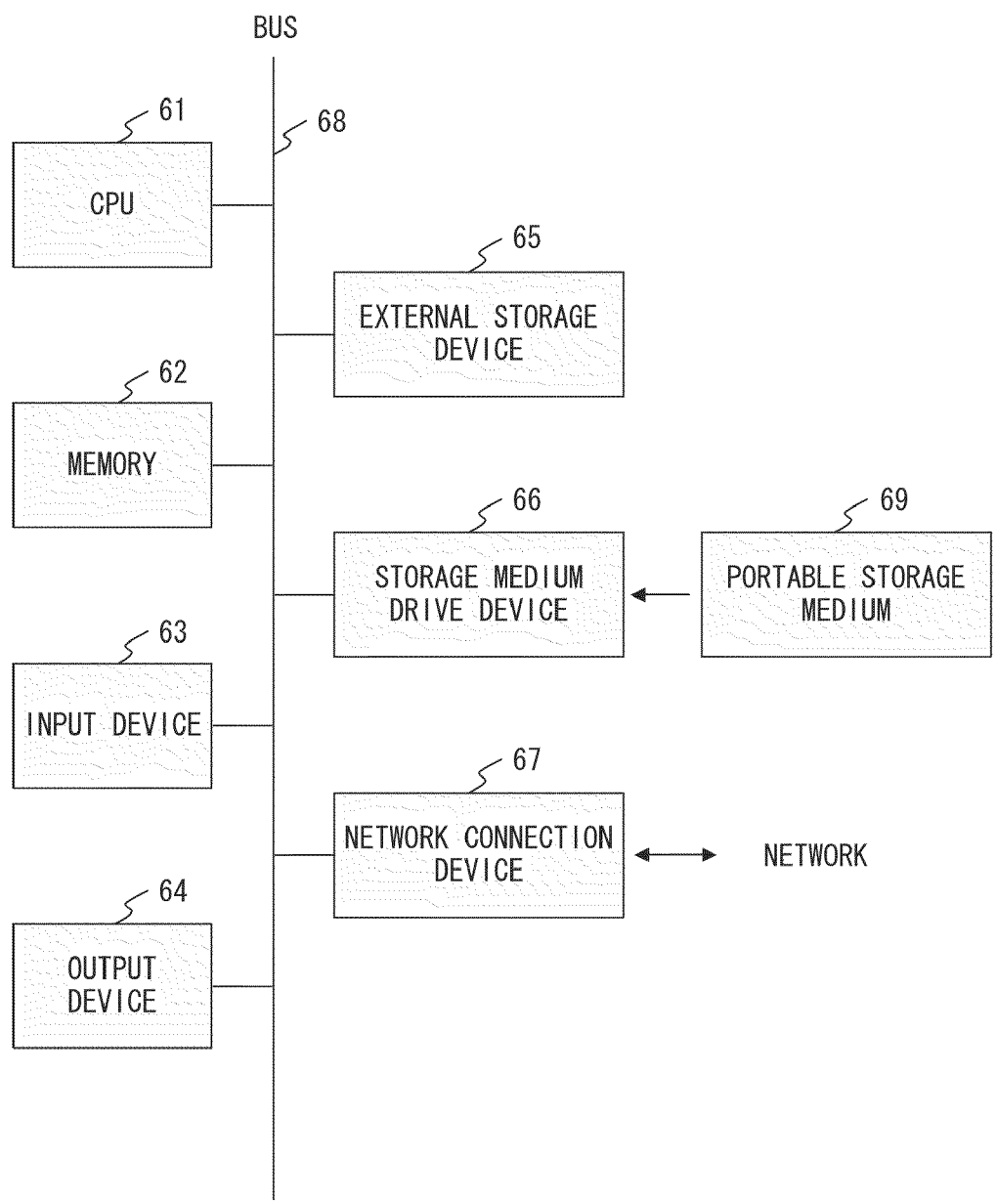
F I G. 1 1

ROUTE CURVE GENERATION SYSTEM, METHOD AND STORAGE MEDIUM

CROSS-REFERENCE TO RELATED APPLICATION

This application is a continuation application of international PCT application No. PCT/JP2007/001433 filed on Dec. 19, 2007.

TECHNICAL FIELD

The present invention relates to a technology for generating a curve becoming the route of a deformable linear structure, such as a cable or the like passing through two passing points generated by route design.

BACKGROUND ART

In some device for developing a product, a cable is used for electric wiring. Wire harness is a processed wire or cable and is an indispensable component in most of devices provided with a plurality of units a vehicle or the like. Therefore, recently software for supporting route design for arranging the cable (hereinafter called "route design support software") has been sold. In a manufacturing business, since CAD (computer-aided design) is widely introduced, the support software usually designs a cable route for arranging a cable in a device in virtual space, using the design data of the device. A design support system for supporting the route design of a cable is realized by enabling a data processing device (computer) to execute the route design support software.

A cable is a component having fairly high flexibility. However, if design is made without taking a cable into consideration, sometimes the design of a product has to be modified due to a cable. This is because inconveniences, such as facts that a cable has to be bended by force, that its fitting operability is bad, that it interferes with another component and the like, can be easily overlooked. In route design using design data, such overlooking of inconveniences can be easily avoided.

In route design using a design support system, a passing point being a position through which a cable passes is specified (generated). In the position specification of the passing point, a positional reference being a position which becomes a reference in specifying the position is usually selected as an attribute. For the positional reference, one based on the origin of a coordinate system in virtual space, one based on another passing point or one based on a component (model) disposed in virtual space is used.

The route of a cable is determined by calculating a curve which passes through each passing point. There is no calculation expression which can completely express the curve (Even if there is such a calculation expression, it is considered that it is very complex/difficult to solve). Thus, it is popular to calculate a parametric curve, more particularly a Bezier curve for the curve. Therefore, it is common to manage the passing direction of a cable in addition to the position as passing point information. Such a route curve generation system is mounted on a design support system in order to generate a route (curve) that passes through a cable.

The route curve generation system generates a curve for each between two continuous passing points. When generating a Bezier curve as the curve, one or more control points are arranged in addition to two passing points. Generally, in order to generate a more complex curve, degree (the number of control points) has to be increased. A Bezier curve can be generally expressed as follows.

[Mathematical expression 1]

$$r(t) = \sum_{k=0}^{N} {}_NC_k \cdot t^k \cdot (1-t)^{(N-k)} \cdot P(k) \qquad (1)$$

In the above equation, N and P (k) are degree and the k-th control point, respectively.

A Bezier curve passes through only the first and last ones, of control points and control points between them are used only to determine the shape of a curve. Therefore, of the two passing points, one and the other are used as the first control point (starting point) and last control point (ending point), respectively. By using two passing points thus, a Bezier curve passing through them can be generated.

In an actual cable (including wire harness and the like), sometimes there is a length constraint besides the curve constraint.

An actual cable cannot be bended beyond a certain value determined by its material, length, thickness and the like. In virtual space, the local curve of a cable route can be expressed by a curvature radius compared to a circular arc or the like, as illustrated in FIG. 1. In FIG. 1, R, P1-3 and LC indicate a curvature radius, passing points and a cable route, respectively. In order to meet the curve constraint, it is necessary to make a curvature radius equal to or more than the minimum curvature radius across the entire route. The length constraint occurs when calculating cable length needed to connect between passing points with the minimum line length, when connecting between passing points with specified line length and so on.

Some conventional route curve generation system expresses a route by a three-degree Bezier curve. This three-degree Bezier curve has two control points besides two starting and ending passing points (control points). The two control points are arranged in respective passing directions at the starting and ending points, as illustrated in FIG. 2, in order to maintain the continuity of the curve. Therefore, they can be very easily handled. In FIG. 2, P1, P2, V1, V2, C2 and C3 are a starting passing point (control point), an ending passing point (control point), the passing direction of the passing point P1, the passing direction of the passing point P2, a control point arranged in the passing direction V1 of the passing point P1 and a control point arranged in the passing direction V2 of the passing point P2 (more accurately, in a passing direction the reversal of the passing direction V2 from the passing point P2), respectively. In this way, a control point is indicated by a symbol string which has "C" as a head and in which a numeric value indicating order from the starting control point (passing point P1) is attached to the "C" as a symbol accompanying it. Thus, for example, "C2" indicates a control point positioned following the starting control point C1 being the passing point P1. This also applies to other control points.

In the three-degree Bezier curve, an appropriate route cannot be often determined in virtual space even between passing points through which a cable can be actually arranged. For example, as illustrated in FIG. 3, when the passing points P1 and P2 are closely positioned and their passing directions V1 and V2 are parallel or almost parallel to each other, although there is actually a route LC whose curvature radius is larger than a circle SM of the minimum curvature radius, between the passing points P1 and P2, in virtual space, two control points C2 and C3 are arranged as illustrated in FIG. 4 and as a result, the minimum curvature radius in the route LC is that of a circle SR whose curvature radius is smaller than the circle SM. Therefore, in the conventional route curve generation system which can take into consideration the curve and wire length constraints, a four or more-degree Bezier curve is usually used. Hereinafter, the actual minimum curvature radius in an LC route and the minimum curvature radius being curve constraint are called "minimum rout curvature radius" and "default radius", respectively, in order to discriminate the actual minimum curvature radius in an LC route from the minimum curvature radius being the curve constraint of a cable.

In a four or more-degree Bezier curve, for example, a five-degree Bezier curve, four control points are arranged in addition to the two passing points P1 and P2. Thus, when using a five-degree Bezier curve, convergence calculation repeating the rearrangement of the four control points is controlled until a route (Bezier curve) meeting all constraints is obtained. The arrangement method of four control points includes, for example, the following one. They will be explained in detail below with reference to FIG. 5.

(1) Starting and ending passing points are assumed to be control points C1 and C6, respectively.

(2) In order to maintain the continuity of a curve, it is for control points C2 and C5 to exist in a line segment parallel to a passing direction passing through the control points C1 and C6, respectively. Therefore, the control points C2 and C5 are arranged in a passing direction from the control point C1 (passing point P1) and a direction the reversal of a passing direction from the control point C6 (passing point C6), respectively, away by a predetermined offset (hereafter called "first offset" for convenience' sake).

(3) Vector going from the control point C1 toward the control point 2 and vector going from the control point C6 toward the control point 5 are defined as A and B, respectively. Furthermore, a temporary mid-point TM is set in a position away from the mid-point M of a straight line connecting the control points C2 and C5 by an arbitrary amount h of offset in the composite vector direction of vector A and B.

(4) The control points C3 and C4 are arranged in a position away toward the control point C2 side by a predetermined offset (hereinafter called "second offset" for convenience' sake) and in a position conversely away toward the control point C5 side by the second offset, respectively, in a direction parallel to a linear direction connecting the control points C2 and C5 from the temporary mid-point TM.

The above-described arrangement of control points C2 through C5 is initial arrangement. The convergence calculation is performed while changing the above-described amount h of offset.

FIG. 7 is a flowchart of a route generation process executed by the conventional route curve generation system. The route generation process is performed to the above-described convergence calculation and specifies the arrangement of four control points from which a route (Bezier curve) meeting all constraints is obtained. The constraints are a curve constraint (a condition that the minimum route curvature radius is equal to or less than the default radius) and a length constraint (for example, a condition of being equal to or less than a cable length which is equal or larger than specified line length and is targeted in connecting between passing points (hereinafter called "target line length")). The generation process will be explained in detail below with reference to FIG. 7.

Firstly, in step S1, the target line length and default radius (described as the "minimum curvature" in FIG. 7) of a cable between passing points are specified as initial values. Their specification is performed referring to data preset by a user or using a distance between passing points for the initial value of the target line length. Then, in step S2, α times of the target line length (for example, a value obtained by multiplying it by 0.25 (=α)) is specified as the initial value of the amount h of offset and convergence (repetition) calculation is performed while changing the amount h of offset. After the completion of the convergence calculation, the process advances to step S3.

In step S3, a route (Bezier curve) whose length becomes target line length by changing the amount h of offset. If there is a route whose length becomes target line length, it is determined OK and the process advances to step S5. Otherwise, it is determined NG and the process advances to step S4. Then, in step S4 after setting the target line length longer, the process returns to step S1. Thus, in the subsequent execution of step S1, a longer target line length than the previous time is specified or a value obtained by multiplying the current target line length by β (for example, 1.25 (=β) is set as a new target line length.

In step S5 the minimum route curvature radius is determined. In the determination, only a route whose length is target line length is targeted. If of the routes, there is a route whose minimum route curvature radius is equal to or more than its default radius, it is determined OK and the route generation process is terminated here. Otherwise, namely, if the length does not reach the target line length or if its minimum route curvature radius is equal to or less than its default radius even when the length reaches the target line length, it is determined NG and the process advances to step S4. Thus, a target line length is reset (the length is extended or the like) and the convergence calculation is performed again.

As clearly illustrated in FIGS. 5 and 6, there is a tendency that the smaller is above-described amount h of offset, the shorter becomes the length of a route. However, as illustrated in FIG. 5, even if there is actually a route LS meeting a curve constraint when the passing points P1 and P2 are closely positioned, a route LC generated in virtual space does not often meet the curve constraint. Furthermore, as illustrated in FIG. 6, sometimes there occurs a place where a curve is locally acute, depending on the respective directions of vector A and B. In that case, a route LC meeting the curve constraint does not often generate.

It is important to meet a length constraint. However, compared with a curve constraint, its importance is lower. This is because while the length of the entire cable can be fairly easily modified, the curve constraint has to be always met. Therefore, it is important to surely generate a route meeting a curve constraint. It is considered that a user (designer) can design a route more easily and more rapidly by surely generating such a route.

Deformable linear structures attached to a device are not only fairly slender ones, such as the above-described cable (including an optical cable), wire, wire harness or the like, but also, for example, fairly thick cylindrical one. The cylindrical linear structure is attached in order to pass through a fluid, such as air and the like, or another linear structure through it. It can be said that to design a route more easily and more rapidly means to target all linear structures having a curve constraint regardless of the kind of the linear structure.

Such a linear structure is attached to not only between units of one device (product), such as an electric appliance, a vehicle or the like, but also a plurality of devices arranged in different places. Therefore, a route is sometimes designed in order to attach a linear structure between a plurality of different devices. Even when a route is designed in order to attach a linear structure between a plurality of different devices, it is necessary to design the route in such a way as to meet a curve constraint if the linear structure having such a constraint.

Patent document 1: Japanese Laid-open Patent Publication No. 2004-127925
Patent document 2: Japanese Laid-open Patent Publication No. 2004-172088
Patent document 3: Japanese Laid-open Patent Publication No. 2005-100913
Patent document 4: Japanese Laid-open Patent Publication No. 2000-284130

DISCLOSURE OF INVENTION

It is an object of the present invention to provide a technology for more surely generating a route meeting a curve constraint.

A route curve generation system in each of the first and second aspects of the present invention presumes generating a curve becoming a route of deformable linear structure, which passes through two passing points generated by a route design and includes the following units.

The route curve generation system in the first aspect includes a first control point arrangement unit for arranging control points needed to generate a curve, according to respective pieces of passing point information defined at two passing points, a second control point arrangement unit for rearranging the control points on the basis of a positional relation between the control points arranged by the first control point arrangement unit, a curve generation unit for generating a curve between two points while modifying the arrangement of one or more control points using the arrangement of control points by one of the first and second control point arrangement units as initial arrangement and a curve evaluation unit for evaluating the curves generated by the curve generation unit and extracting a curve meeting a predetermined condition from among the curves.

The route curve generation system in the second aspect includes a control point arrangement unit for arranging control points needed to generate a curve, according to respective pieces of passing point information defined at two passing points, a first curve generation unit for generating a curve between two points while modifying the arrangement of one or more control points using the arrangement of control points by the control point arrangement units as initial arrangement, a curve evaluation unit for evaluating the curves generated by the first curve generation unit and extracting two curves constituting a boundary in which whether or not the curve meets a constraint is modification before and after the modification by one time of the modification of the arrangement of one or more control points, a second curve generation unit for generating a curve between two passing points while finely modifying the arrangement of the one or more control points within a range where the two curves can be obtained when the curve evaluation unit extracts the two curves and a curve selection unit for selecting an optimal curve between two passing points from among the curves generated by the second curve generation unit.

A route curve generation method in each of the first and second aspects of the present invention presumes generating a curve becoming a route of deformable linear structure, which passes through two passing points generated by a route design and generates a curve as follows.

The route curve generation method in the first aspect arranges control points needed to generate a curve, according to respective pieces of passing point information defined at two passing points, re-arranges the control points on the basis of a positional relation between the arranged control points, determines the initial arrangement of the control points needed to generate a curve, generates curves between two passing points while modifying the arrangement of one or more control points from the determined initial arrangement, evaluates the generated curves and extracts a curve meeting a predetermined condition from among the curves.

The route curve generation method in the second aspect arranges control points needed to generate a curve, according to respective pieces of passing point information defined at two passing points, generates curves between two passing points while modifying the arrangement of one or more control points using the arrangement as initial arrangement, evaluates the generated curves and extracts two curves constituting a boundary in which whether or not the curve meets a constraint is changed before and after the modification by one time of the modification of the arrangement of one or more control points, re-generates a curve between two passing points while more finely than the previous time modifying the arrangement of the one or more control points within a range where the two curves can be obtained when extracting the two curves and selects an optimal curve between two passing points from among the re-generated curves.

A program in each of the first and second aspects of the present invention presumes enabling a computer used to constitute a route curve generation system for generating a curve becoming a route of deformable linear structure, which passes through two passing points generated by a route design and enables the computer to realize the following functions.

The program in the first aspect realizes a first control point arrangement function to arrange control points needed to generate a curve, according to respective pieces of passing point information defined at two passing points, a second control point arrangement function to re-arrange the control points on the basis of the positional relation between the control points arranged by the first control point arrangement function, a curve generation function to generate curves between two passing points while modifying the arrangement of one or more control points, using the arrangement of control points by one of the first and second control point arrangement functions and a curve evaluation function to evaluate the curves generated by the curve generation function and to extract a curve meeting a predetermined condition from among the curves.

The program in the second aspect realizes a control point arrangement function to arrange control points needed to generate a curve, according to respective pieces of passing point information defined at two passing points, a first curve generation function to generate curves between two passing points while modifying the arrangement of one or more control points, using the arrangement of control points by the control point arrangement function as initial arrangement, a curve evaluation function to evaluate the curves generated by the first curve generation function and to extract two curves constituting a boundary in which whether or not the curve meets a constraint is changed before and after the modification by one time of the modification of the arrangement of one or more control points, a second curve generation function to generate curves between two passing points while more finely than the first curve generation function modifying the arrangement of one or more control points within a range where two curves can be obtained when the two curves are extracted by the curve evaluation function and a curve selection function to select an optimal curve between two passing points from among the curves generated by the second curve generation function.

When the present invention is applied, control points needed to generate a curve (route), according to respective pieces of passing point information defined at two passing points are arranged, at least one control point is re-arranged, as required, on the basis of the positional relation between the arranged control points, the initial arrangement of the control points needed to generate a curve becoming the route of a deformable linear structure is determined, curves between two passing points are generated while modifying the arrangement of one or more control points from the determined initial arrangement, the generated curves are evaluated and the curve meeting a predetermined condition is extracted from among the curves.

By performing the above-described re-arrangement, as required, the initial arrangement can be made more preferable or optimal. Thus, a possibility that an appropriate curve cannot be generated depending on a positional relation between control points (the position of a passing point itself and its passing direction) can be reduced. Therefore, when a condition to be met by a curve, such as a curve constraint is a predetermined condition, the curve meeting the constraint can be more surely generated.

When the present invention is applied, control points needed to generate a curve are arranged according to respective pieces of passing point information defined at two passing points, curves between two passing points are generated while modifying the arrangement of one or more control points, using the arrangement as initial arrangement, the generated curves are evaluated, two curves constituting a boundary in which whether or not the curve meets a constraint is changed before and after the modification by one time of the modification of the arrangement of one or more control points are extracted, curves between two passing points are re-generated while more finely than the previous time modifying the arrangement of one or more control points within a range where the two curves can be obtained when the two curves are extracted and an optimal curve between two passing points is selected from among the re-generated curves.

Thus, curves are generated within a narrow range by differentiating the fineness of modification in the arrangement of one or more control points and also fairly finely modifying the arrangement. Therefore, an optimal curve can be obtained by the less amount of calculation.

BRIEF DESCRIPTION OF DRAWINGS

FIG. 8 is the functional configuration of a cable route generation system mounting a route curve generation system according to this preferred embodiment.

FIG. 11 is one example of the hardware configuration of a computer capable of realizing the cable route generation system mounting a route curve generation system according to this preferred embodiment.

BEST MODE FOR CARRYING OUT THE INVENTION

Figure 1:
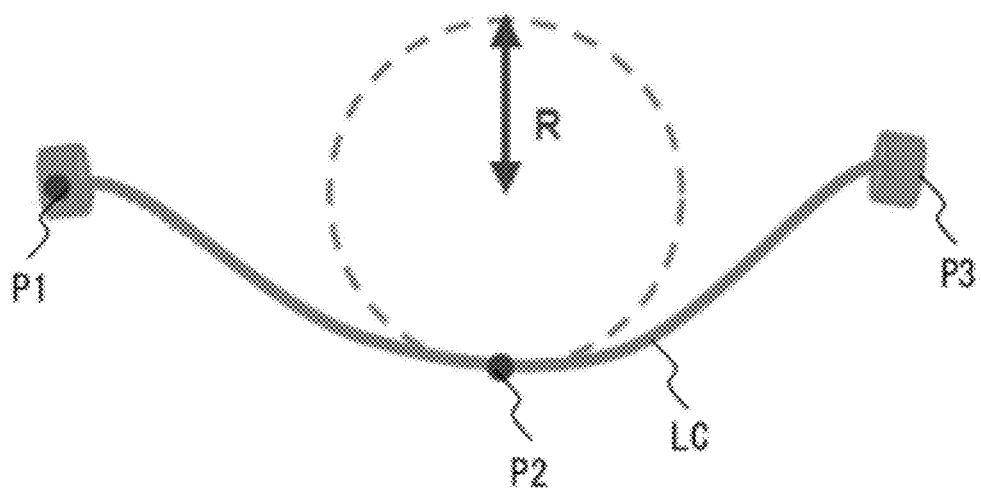
FIG. 1 explains how to express the route curve of a cable (linear structure) generated in virtual space.
Figure 2:
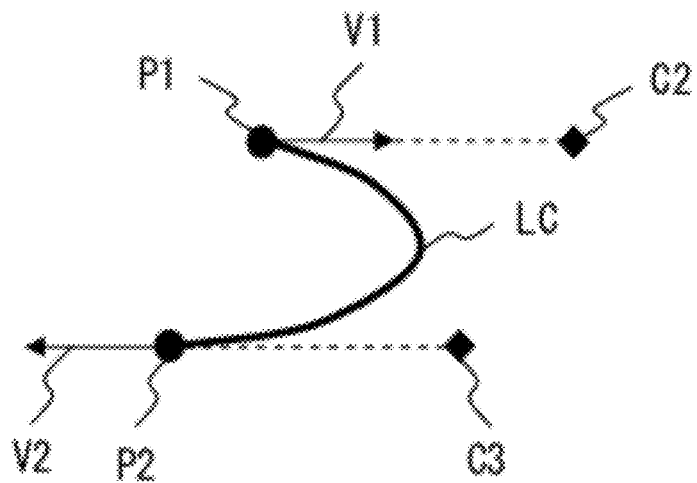
FIG. 2 explains two control points arranged in other places than two passing points when generating a route between the two passing points, using a three-degree Bezier curve.
Figure 3:
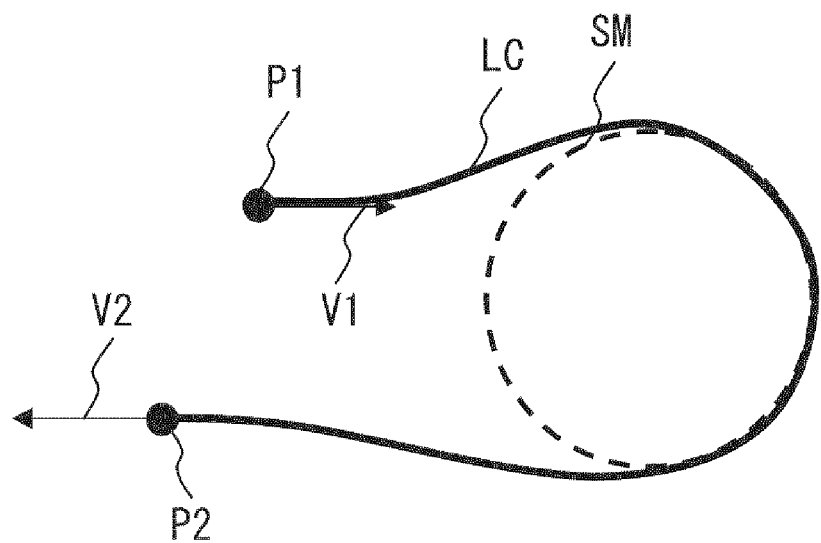
FIG. 3 explains an appropriate route actually exists when passing points P1 and P2 are closely positioned and also their passing directions V1 and V2 are parallel or almost parallel to each other.
Figure 4:
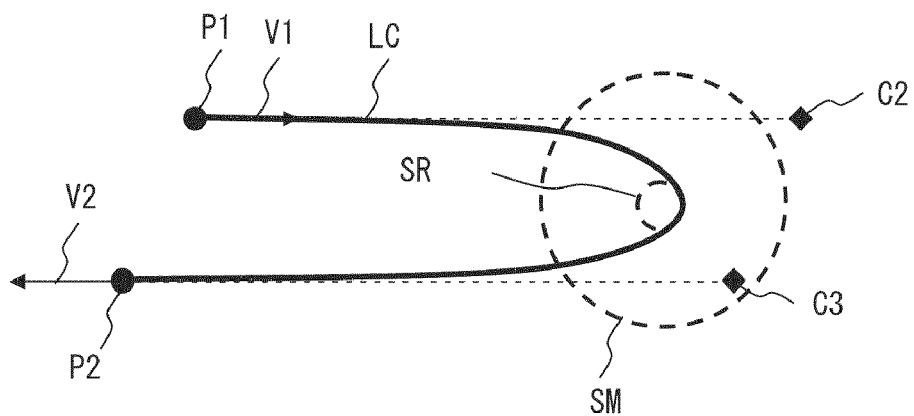
FIG. 4 explains a route generated in virtual space when passing points P1 and P2 are closely positioned and also their passing directions V1 and V2 are parallel or almost parallel to each other.

The preferred embodiments of the present invention will be explained in detail below with reference to the drawings.

FIG. 8 is the functional configuration of a cable route generation system (hereinafter called "generation system") mounting a route curve generation system according to this preferred embodiment. The generation system 2 is used to design the route of a cable being a deformable linear structure and a route curve generation system according to this preferred embodiment can be realized by the generation system 2.

An input device 1 on which a user operates and an output device 3 are connected to the generation system 2. The input device 1 includes, for example, a pointing device, such as a mouse and the like, and a keyboard. The output device 3 is, for example, a display device, such as an LC display device or the like. Thus, the generation system 2 edits passing points according to a user's operation for route design on the input device 1 and displays the result of the edition or a cable whose route is designed on the output device 3.

The generation system 2 includes a cable management unit 21, a three-dimensional model management unit 22, a passing point management unit 23, a display unit 24 and a route generation unit 25.

The cable management unit 21 manages the route design of each cable. The three-dimensional model management unit 22 manages the design data (model data) of components arranged in a device designed three-dimensionally. The model data is stored in a model data database (hereinafter Called "DB") 22a and is managed by a verification model management unit 22b. The passing point management unit 23 manages passing points by cable unit under the control of the cable management unit 21. The passing point management unit 23 includes a passing point position individual management unit 23a, a passing direction management unit 23b and a passing direction reference coordinates management unit (hereinafter called "coordinates management unit") 23c for passing point information management. The display unit 24 is used to display images on the output device 3. An image for displaying generated passing points is generated by the passing point display unit 24a.

The route generation unit 25 is used to generate the route of a cable whose route is designed. A route curve generation system according to this preferred embodiment is realized as the route generation unit 25. The route generation unit 25 includes a control point management unit 25a, a type determination unit 25b, a curve calculation unit 25c and a curve determination unit 25d.

FIG. 11 is one example of the hardware configuration of a computer capable of realizing the cable route generation system mounting a route curve generation system according to this preferred embodiment. Prior to the detailed explanation of FIG. 8, the configuration of a computer capable of realizing the generation system 2 will be explained in detail. For the purpose of avoiding confusion, in the following explanation, it is presumed that the generation system 2 is realized by one computer whose configuration is illustrated in FIG. 11.

The computer illustrated in FIG. 11 includes a CPU 61, memory 62, an input device 63, an output device 64, an external storage device 65, a storage medium drive device 66 and a network connection device 67, which are connected to each other by a bus 68. The configuration illustrated in FIG. 11 is one example and is not restrictive of the invention.

The CPU 61 controls the entire computer. The memory 62 is memory, such as RAM or the like, for temporarily storing programs and data stored in the external storage device 65 (or a portable storage medium 69) at the time of program execution, data update and the like. The CPU 61 controls the entire computer by reading the program into the memory 62 and executing it.

The input device 63 is an interface connected to the input device 1, such as a keyboard, a mouse or the like, or one including all of them. The input device 63 detects a user's operation on the input device 1 and notifies the CPU 61 of the detection result.

The output device 64 is, for example, a display control device connected to the output device 3 illustrated in FIG. 8 or one including all of them. The output device 64 displays data transmitted under the control of the CPU 61 on the output device 3 illustrated in FIG. 8.

The network connection device 67 is used to communicate with an external device via a network, such as an intra-net, the Internet or the like. The external storage device 65 is, for example, a hard disk device and is mainly used to store various types of data and programs.

The storage medium drive device 66 is used to access a portable storage medium, such as an optical disk, a magneto-optical disk or the like.

The result of route design is stored in either the memory 62 or the external storage device 65. Design data including the model data of a device for arranging a cable is stored in either the external storage device 65 or the portable storage medium 69. In this description, it is assumed that the design data is stored in the external storage device 65, for convenience' sake. In that case, the DB 22a is stored in the external storage device 65.

The route curve generation system according to this preferred embodiment (generation system 2) can be realized by the CPU 61 executing a program mounting functions necessary for it (hereinafter called design support software"). The design support software can be recorded on, for example, the portable storage medium 69 and be distributed, or can be obtained from the network connection device 67. In this description it is assumed that the design support software is stored in the external storage device 65.

In the above-described assumption, the cable management unit 21 can be realized by, for example, the CPU 61, the memory 62, the input device 63, the external storage device 65 and the bus 68. The passing point management unit 23, the route generation unit 25 and the three-dimensional model management unit 22 can be realized by, for example, the CPU 61, the memory 62, the external storage device 65 and the bus 68. The display unit 24 can be realized by, for example, the CPU 61, the memory 62, the output device 64, the external storage device 65 and the bus 68.

When a user generates a new passing point or modifies the position of an existing passing point, this preferred embodiment generates a route between passing points is generated as follows. The operation will be explained in detail below with reference to FIGS. 5, 6 and 9. Since the explanation is made with reference to FIGS. 5 and 6, the same reference numerals are attached to the same or basically same components and it is assumed that a five-degree Bezier curve is used.

Firstly, the arrangement method of basic control points will be explained. Since the arrangement method is the basically same as that of the conventional route curve generation system, the method will be explained in detail with reference to FIG. 5.

A route is generated between two passing points. Of the two passing points, a passing point P1 corresponding to a parent is assumed to be a starting point and the passing point P1 is assumed to be a control point C1. A control point C2 is arranged in a position away from the passing point P1 in a passing direction by a predetermined offset (hereinafter called "first offset"). The passing direction is assumed to be vector A.

Of the two passing points, a passing point P2 corresponding a child is assumed to be an ending point and the passing point P2 is assumed to be a control point C6. A control point C5 is arranged in a position away from the passing point P2 in a direction the reversal of the passing direction by the first offset. The direction the reversal of the passing direction is assumed to be vector B.

Then, a temporary mid-point TM is set in a position away from a mid-point M on the straight line connecting the control points C2 and C5 in the composite vector direction of vector A and B by an arbitrary amount h of offset. Alternatively, the composite vector of vector A and B is generated from the mid-point M and the temporary mid-point TM can be set in a position away from the straight line connecting the control points C2 and C5 in a direction the reversal of a perpendicular from the tip of the composite vector to the straight line by the amount h of offset.

A control point C3 is arranged in a position away from the temporary mid-point TM toward the control point C2 in a direction parallel to a linear direction connecting the control points C2 and C5 by a predetermined offset (hereinafter called "second offset"). Conversely a control point C4 is arranged in a position away from the temporary mid-point TM toward the control point C5 by the second offset.

Figure 5:
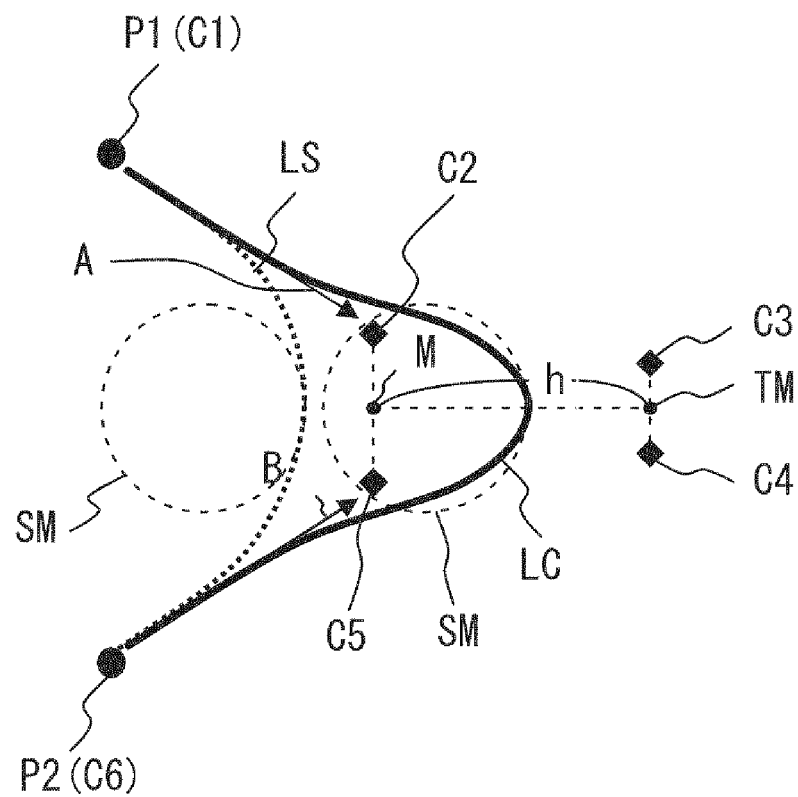
FIG. 5 explains the positional relation between passing points in which the conventional route generation system for generating a route using a five-degree Bezier curve cannot generate an appropriate route (No. 1).
Figure 6:
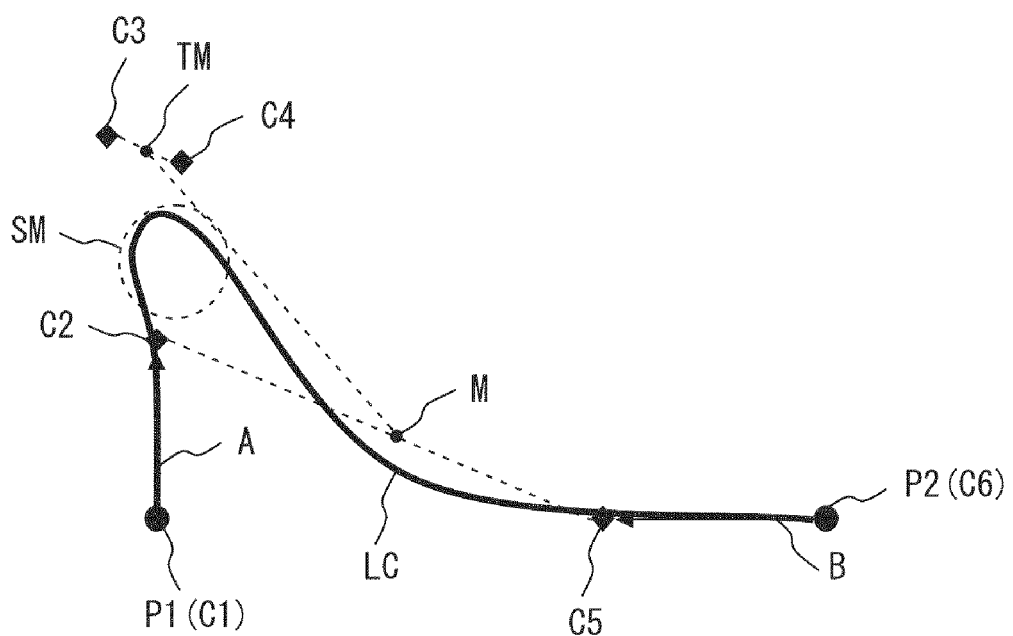
FIG. 6 explains the positional relation between passing points in which the conventional route generation system for generating a route using a five-degree Bezier curve cannot generate an appropriate route (No. 2).

The above-described arrangement of the control points C2 through C5 is initial arrangement. In the convergence calculation performed while modifying the above-described amount h of offset, in the case of the positional relation between the passing points P1 and P2 as illustrated in FIGS. 5 and 6, there is a high possibility that a route meeting a curve constraint cannot be calculated. Therefore, in this preferred embodiment, the arrangement of control points is controlled as follows.

The arrangement of control points is controlled when arrangement conditions are met. The following two are provided as such conditions as follows.

(1) The composite vector of vector A and B is within a first range compared with vector A (the lower limit of a first range≦composite vector/vector A≦the upper limit of a first range) and also a linear distance between the control points C2 and C5 is equal to or less than a first threshold value compared with the first offset (a linear distance/the first offset≦a first threshold value).

(2) At least one of an angle formed by a line segment C2C3C4 linearly connecting control points C2 through C4 (an angle formed by a straight line connecting control points C2 and C3 and a straight line connecting control points C3 and C4) and an angle formed by a line segment connecting between control points C3 through C5 is equal to or less than the reference angle.

The above-described arrangement condition 1 indicates a state where passing points P1 and P2 are closely positioned and also the directions of vector A and B are fairly close to parallel to each other, for example, as illustrated in FIG. 5. In such a state, the minimum route curvature radius of a route LC tends to decrease. Therefore, arrangement is controlled by making a first offset shorter. Thus, control points C2 and C5 are re-arranged nearer control points C1 and C6, respectively. By such re-arrangement, a route LS meeting a curve constraint as illustrated in FIG. 5 can be generated. Therefore, a route meeting a curve constraint can be more surely generated.

The above-described composite vector decreases when vector A and B is almost in an opposite direction each other, namely, when passing points P1 and P2 can be connected linearly or almost linearly. In such a case, even when a distance between control points C2 and C5 is short, there is no problem. It is for this reason that the above-described first range is not used as a threshold value. In this preferred embodiment, 2 is used as the above-described first threshold value and when the arrangement condition 1 is met, the first offset is made ¼ of the original.

Although the above-described is targeted to both the control points C2 and C5, it can be also targeted to one of them. This is because even when only one of them is rearranged, a route meeting a curve constraint can be generated with a high probability. When only one of them is rearranged, it is preferable, for example, to calculate respective angles formed by vector A/B and a straight line connecting the passing points P1 and P2 and to select the smaller angle.

Figure 9:
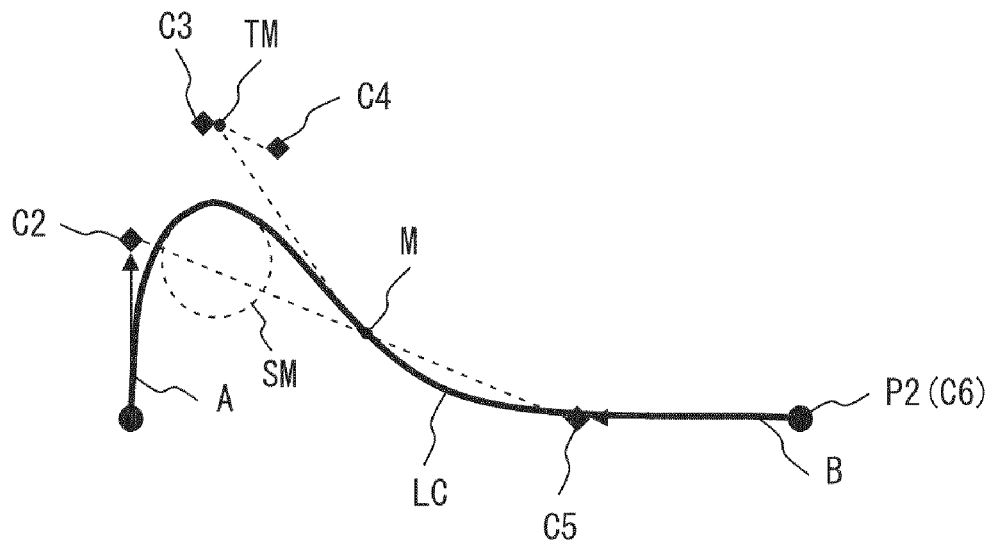
FIG. 9 explains the re-arrangement of control points controlled in the case of the positional relation between the passing points illustrated in FIG. 6.

The above-described arrangement condition 2 assumes a case where the curve of a route becomes locally acute, for example, as illustrated in FIG. 6. In the case as illustrated in FIG. 6, an angle formed by a line segment C2C3C4 decreases and an angle formed by a line segment C3C4C5 increases. Therefore, if the angle formed by a line segment C2C3C4 is equal to or less than the reference angle, a distance between the temporary mid-point TM and the control point C3 (the second offset) is shortened and the angle formed by the line segment C2C3C4 is increased. Conversely, if the angle formed by the line segment C3C4C5 is equal to or less than the reference angle, a distance between the temporary mid-point TM and the control C4 (the second offset) is shortened and the angle formed by the line segment C3C4C5 is increased. By such re-arrangement, even in the case illustrated in FIG. 6, a route LC meeting a curve constraint can be generated, as illustrated in FIG. 9. As clear from this, a route meeting a curve constant can be more surely generated.

The convergence calculation while modifying the above-described amount h of offset is performed after checking which the initial arrangement meets, the arrangement conditions 1 or 2 and performing necessary re-arrangement according to the check result. Thus, a route meeting a length constraint besides the curve constraint can be generated more appropriately and more surely.

The arrangement conditions for the re-arrangement of control points are not limited to the above-described arrangement conditions 1 and 2. More arrangement conditions can be also prepared. The re-arrangement method can be determined for each prepared arrangement condition. For example, if the angle formed by the line segment C3C4C5 is sufficiently large, the angle formed by the line segment C2C3C4 can be also increased by controlling an angle formed by a straight line connecting the mid-point M and the temporary mid-point TM and a straight line connecting the control points C2 and C5.

The above-described arrangement conditions 1 and 2 assume to generate a five-degree Bezier curve. If a four or more-degree Bezier curve is used, those arrangement conditions can be similarly set. If a four or more-degree Bezier curve is used, the above-described re-arrangement method can be also easily applied.

Back to FIG. 8, the operations of the respective units, for realizing the above-described route design support 21 through 25 will be explained in detail below.

The cable management unit 21 analyzes an operation applied to the input device 1, recognizes the instruction contents of a user and performs a process according to the recognition result. By such a process, route design can be realized and as a result of the design, the data of passing points generated by edition is generated/stored by the passing point management unit 23.

The passing point management unit 23 generates a table for passing point information management (hereinafter called "passing point position table") for each target cable whose route is designed and updates it, as required. The passing point position table stores, for example, the passing point information includes the position, passing direction, positional references and the like, of passing point, for each passing point. The passing point position table is updated under the control of, for example, the cable management unit 21.

The passing point position individual management unit 23a stores/updates the respective pieces of data of the positional reference, such as relative positional coordinates, reference positional coordinates, a reference model name, a reference model relative position and the like. The passing direction management unit 23b determines a passing direction. The passing direction reference coordinates management unit 23c stores/updates data for each axis indicating the determined passing direction. Any of these operations is performed according to the instruction contents of the user, recognized by the cable management unit 21. Thus, route design via the edition of passing points is supported.

The route generation unit 25 generates a cable route designed by a user for each between passing points which are in the parental relation by referring to the passing point position table and transmits the generation result to the display unit 24. Thus, the cable along the route is displayed on the output device 3 as the design result.

The control point management unit 25a manages control points for calculating a route (curve) between passing points and sets/updates their arrangement. The type determination unit 25b determines a type corresponding to the arrangement on the basis of the arrangement (initial arrangement) of control points, set by the control point management unit 25a. The type is determined by extracting arrangement meeting either the above-described arrangement conditions 1 or 2. The control point management unit 25a modifies (controls) the arrangement of control points according to the determination result.

The curve calculation unit 25c calculates curve according to the currently set arrangement of control points. At the time of repetition calculation, the control point management unit 25a sequentially modifies the amount h of offset and notifies the curve calculation unit 25c of the arrangement of control points.

The curve determination unit 25d calculates the minimum route curvature radius and length of a curve calculated for each arrangement of control points by the curve calculation unit 25c and extracts the arrangement of control points (that is, the amount h of offset) being a curve whose curvature radius is equal to or more than the default radius being the threshold value. The curve determination unit 25d notifies the control point management unit 25a of the extraction result. Upon receipt of the notice, the control point management unit 25a more finely limits a range within which the amount h of offset should be modified and sets the arrangement of control points while modifying the amount h of offset within the range. Then, the curve calculation unit 25c calculates a route (curve) for each set arrangement. The curve determination unit 25d finally selects one optimal route. The route selected thus is displayed on the output device 3 via the display unit 24.

Figure 10:
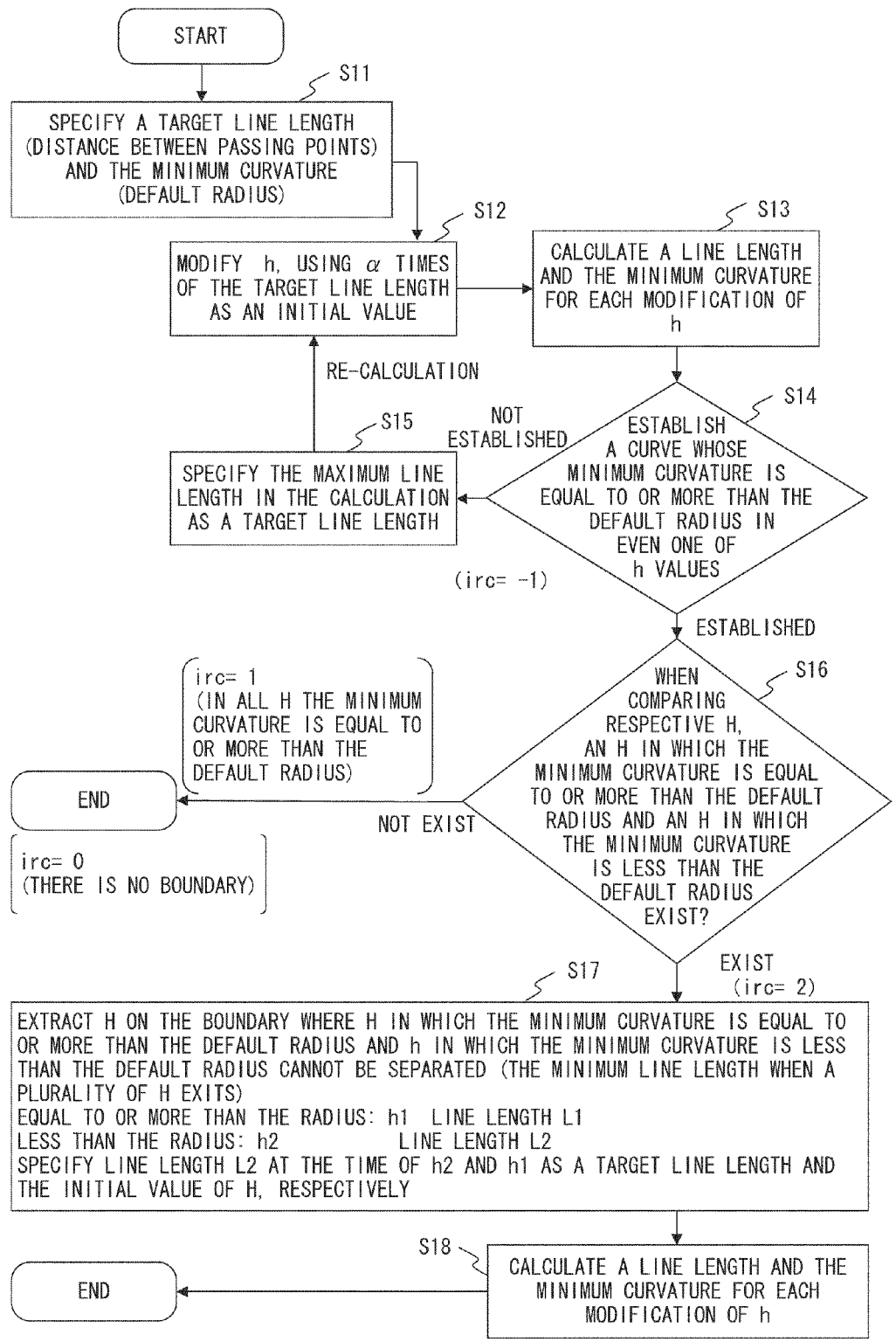
FIG. 10 is a flowchart of the route generation process.

FIG. 10 is a flowchart of the route generation process. When a user generates a new passing point or modifies the position of a passing point, the route generation process is executed in order to generate a route connecting the passing point and a passing point positioned immediately before (a parent passing point) or/and a passing point positioned immediately after (a child passing point). This can be realized by the CPU 61 illustrated in FIG. 11 reading the design support software stored in the external storage device 65 into the memory 62 and executing it. Next, a process for realizing the operation of the above-described generation system 2 will be explained in detail with reference to FIG. 10.

Firstly, in step S11, the target line length of a cable between passing points (a target curve distance between passing points) and the default radius are specified. They are specified by either referring to data preset by a user or using a distance passing points as the initial value of the target line length. The data is, for example, managed by the passing point management unit 23. Then, in step S12, convergence (repetition) calculation is performed using 0.25 times of the target line length as the initial value of the amount h of offset while modifying the amount h of offset. During the convergence calculation, step S13 is executed.

In step S13, a route is generated every time the amount h of offset is modified and the line length and the minimum route curvature radius are calculated. After the completion of this convergence calculation, in step S14, it is determined whether a route (curve) whose minimum route curvature radius is equal to or more than the default radius in at least one of the modified amounts h of offset is established (generated). If there are such one or more routes, it is determined that it is "established" and the process advances to step S16. Otherwise, it is determined "not established" and the process advances to step S15. Then, in step S15, the maximum allowable line length is set for the target line length. Afterward, the process returns to step S12.

In step S16, it is determined whether of the modified amounts h of offset, there are both one in which the minimum route curvature radius is equal to or more than the default radius and one in which the minimum route curvature radius is less than the default radius. If there is no amount h of offset in which the minimum route curvature radius is less than the default radius or there is no boundary between the amount h of offset in which is equal to or more than the default radius and the amount h of offset in which is less than the default radius, it is determined "not exist". Then, for example, after storing the shortest one of routes meeting a curve constraint as the final result, the route generation process is terminated. Otherwise, namely, if one or more boundaries between the amount h of offset in which is equal to or more than the default radius and the amount h of offset in which is less than the default radius, it is determined "exist" and the process advances to step S17.

In step S17, the amount h of offset on the boundary is extracted, and then the minimum amount h1 of offset in which the minimum route curvature radius is equal to or more than the default radius, its line length L1, the maximum amount h2 of offset in which the minimum route curvature radius is less than the default radius and its line length L2 are extracted. Thus, the line length L2 and the amount h1 of offset are set for the target line length and the initial value of the amount h of offset, respectively. If there are a plurality of boundaries, one whose amount h of offset is a minimum is adopted.

Then, in step S18, the amount h of offset is more finely modified than in step S13, a route is generated every time the amount h of offset is modified and its line length and minimum route curvature radius are calculated. Thus, a route whose minimum route curvature radius is equal to or more than the default radius and whose amount h of offset is a minimum is stored as the final result and the route generation process is terminated.

Figure 7:
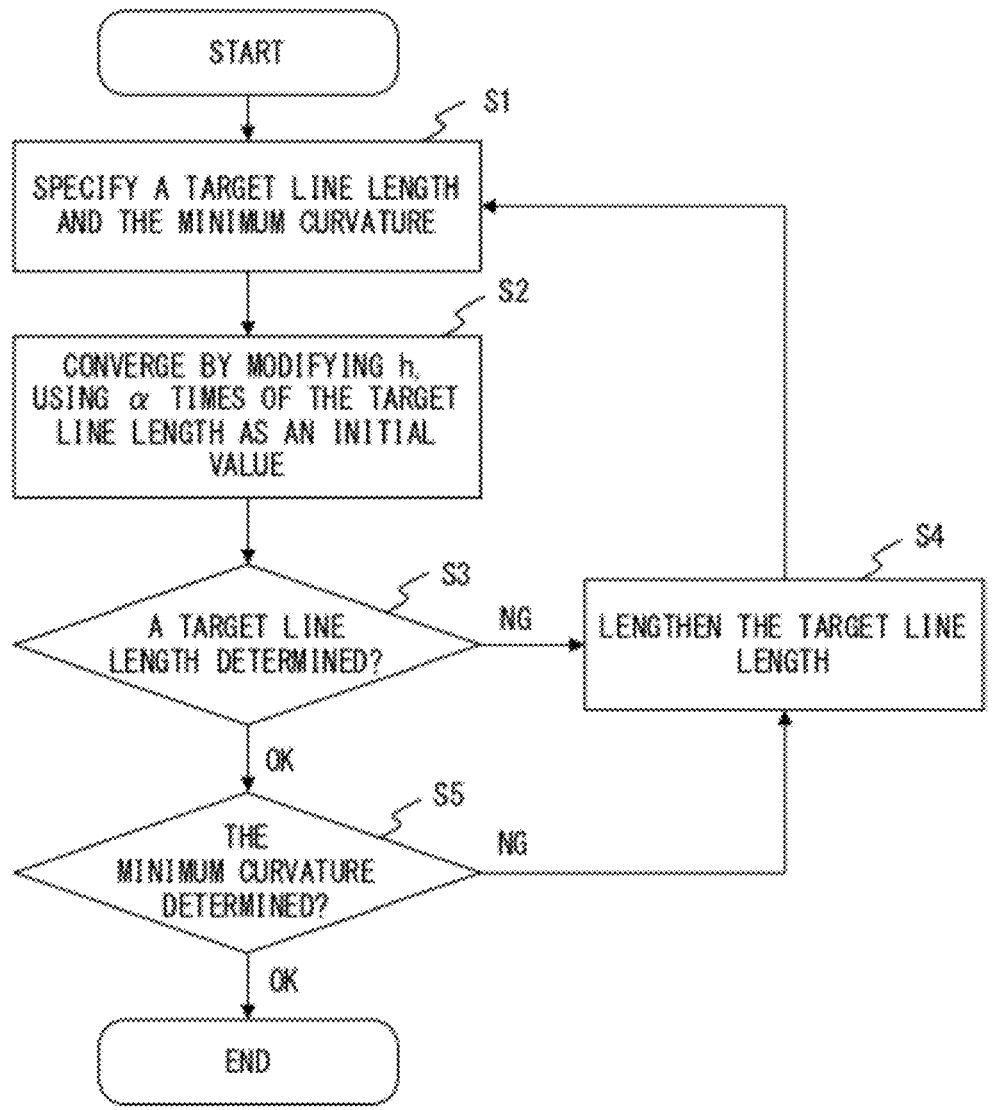
FIG. 7 is a flowchart of a route generation process executed by the conventional route curve generation system.

Thus, in this preferred embodiment, firstly the first convergence calculation (step S13) in which the amount h of offset is fairly roughly modified and then the second convergence calculation (step S18) in which the amount h of offset is finely modified is performed, as required according to the calculation result. Thus, compared with the conventional route curve generation system (FIG. 7) in which the convergence calculation is performed with the same modification width, a final result can be more rapidly obtained while accuracy is maintained.

The above-described determination in steps S14 and S16 is performed by preparing a variable irc and assigning a value to be assigned to the variable irc in step S13. FIG. 10 also illustrates the value of the variable irc by which respective determination results in steps S14 and S16.

Although in this preferred embodiment, control points are re-arranged before executing the route generation process, this is made in order to more rapidly obtain more preferable final result. Alternatively, it can be determined whether to re-arrange control points, on the basis of the execution result of the route generation process and the re-arrangement can be performed according to the determination result.

Furthermore, although a cable (including wire harness, an optical cable and the like) is targeted for a deformable linear structure, another different type structure can be also targeted. As to the target on which a route is designed, namely, a target thing to which a linear object is attached, it can also be a thing including a plurality of devices arranged in different places.

The invention claimed is:

1. A route curve generation system for generating a curve becoming a route of a deformable linear structure which passes through two passing points generated by route design, comprising:
   a CPU, and
   a memory to store a program causing the CPU to execute a process including,
   arranging control points needed to generate the curve, according to respective pieces of passing point information defined at the two passing points, the control points including the two passing points;
   rearranging the control points on the basis of a positional relation between the control points arranged by the arranging;
   generating the curve between the two points while modifying the arrangement of one or more control points, using the arrangement of control points achieved by one of the arranging and the rearranging as initial arrangement; and
   evaluating curves generated by the generating and extracting a curve meeting a predetermined condition from among the curves, wherein
   vectors A and B are two vectors going from the two passing points toward control points adjacent to the two passing points, and the rearranging the control points is performed when a composite vector of the vectors A and B is within a first range compared with the vector A and when a distance between the control points adjacent to the two passing points is equal to or less than a first threshold value compared with a distance between each of the two passing points and its adjacent control point.

2. The route curve generation system according to claim 1, wherein when the generating generates a four or more-degree Bezier curve as the curve, the rearranging re-arranges at least one of four control points excluding the two passing points arranged by the arranging.

3. The route curve generation system according to claim 2, wherein the rearranainq performs the re-arrangement by at least one of making at least one of two linear distances between the two passing points and respective control points positioned next to the two passing points shorter and making an angle of a line segment connecting among three control points of the four control points excluding the two passing points larger.

4. The route curve generation system according to claim 3, wherein the rearranainq performs the re-arrangement in such a way as to make at least one of linear distances between the two passing points and the two control points shorter, based on at least respective linear distances two control points positioned next to the two passing points.

5. The route curve generation system according to claim 1, wherein
the evaluating can extract two curves constituting a boundary in which a result of determination whether or not the curve meets a constraint to be met is changed before and after one modification of arrangement of the one or more control points as the curve meeting the predetermined condition and when the evaluating extracts the two curves,
the generating generates the curve between the two passing points while modifying arrangement of the one or more control points within a range where the two curves can be obtained more finely than the previous modifying.

6. A route curve generation system for generating a curve becoming a route of a deformable linear structure which passes through two passing points generated by route design, comprising:
a CPU, and
a memory to store a program causing the CPU to execute a process including,
arranging control points needed to generate the curve, according to respective pieces of passing point information defined at two passing points;
first generating the curve between the two points while modifying arrangement of one or more control points, using arrangement of the control points achieved by the arranging as initial arrangement, wherein
vectors A and B are two vectors going from the two passing points toward control points adjacent to the two passing points, and
the modifying arrangement of one or more control points is performed when a composite vector of the vectors A and B is within a first range compared with the vector A and when a distance between the control points adjacent to the two passing points is equal to or less than a first threshold value compared with a distance between each of the two passing points and its adjacent control point;
evaluating curves generated by the first generating and extracting two curves constituting a boundary in which whether or not the curve meets a constraint to be met is changed before and after the modification by one time of modification of arrangement of the one or more control points;
second generating a curve between the two passing points while finely modifying arrangement of the one or more control points within a range where the two curves can be obtained when the evaluating extracts the two curves; and
selecting an optimal curve between the two passing points from among curves generated by the second generating.

7. A route curve generation method for generating, by a computer, a curve becoming a route of a deformable linear structure, which passes through two passing points generated by route design, comprising:
arranging, by the computer, control points needed to generate the curve, according to respective pieces of passing point information defined at the two passing points;
re-arranging, by the computer, the control points on the basis of a positional relation between the arranged control points and determining initial arrangement of the control points needed to generate the curve;
generating, by the computer, curves between the two passing points while modifying arrangement of one or more control points from the determined initial arrangement, wherein
vectors A and B are two vectors going from the two passing points toward control points adjacent to the two passing points, and
the re-arranging the control points is performed when a composite vector of the vectors A and B is within a first range compared with the vector A and when a distance between the control points adjacent to the two passing points is equal to or less than a first threshold value compared with a distance between each of the two passing points and its adjacent control point; and
evaluating, by the computer, the generated curves and extracting a curve meeting a predetermined condition from among the curves.

8. The route curve generation method according to claim 7, wherein
extracting, by the computer, two curves constituting a boundary in which whether or not the curve meets a constraint is changed before and after the modification by one time of modification of arrangement of the one or more control points as the curve meeting the predetermined condition;
when the two curves are extracted, generating, by the computer, the curve between the two passing points while modifying arrangement of the one or more control points within a range where the two curves can be obtained more finely than the previous modifying.

9. A route curve generation method for generating, by a computer, a curve becoming a route of a deformable linear structure, which passes through two passing points generated by route design, comprising:
arranging, by the computer, control points needed to generate the curve, according to respective pieces of passing point information defined at the two passing points;
generating, by the computer, the curves between the two passing points while modifying arrangement of one or more control points, using the arrangement as initial arrangement, wherein
vectors A and B are two vectors going from the two passing points toward control points adjacent to the two passing points, and
the modifying arrangement of one or more control points is performed when a composite vector of the vectors A and B is within a first range compared with the vector A and when a distance between the control points adjacent to the two passing points is equal to or less than a first threshold value compared with a distance between each of the two passing points and its adjacent control point;

evaluating, by the computer, the generated curves and extracting two curves constituting a boundary in which whether or not the curve meets a constraint to be met is changed before and after the modification by one time of modification of arrangement of the one or more control points;

when extracting the two curves, re-generating, by the computer, a curve between the two passing points while modifying arrangement of the one or more control points within a range where the two curves can be obtained more finely than the previous modifying; and selecting, by the computer, an optimal curve between the two passing points from among the re-generated curves.

10. A non-transitory computer-accessible storage medium on which is recorded a program enabling a computer used to build a route curve generation system for generating a curve becoming a route of a deformable structure, which passes through two passing points generated by route design to execute functions, the functions comprising:

a first control point arrangement function capable of for arranging control points needed to generate the curve, according to respective pieces of passing point information defined at the two passing points;

a second control point arrangement function for rearranging the control points on the basis of a positional relation between the control points arranged by the first control point arrangement function;

a curve generation function generating the curve between the two points while modifying the arrangement of one or more control points, using the arrangement of control points by one of the first and second control point arrangement functions as initial arrangement; and a curve evaluation function evaluating curves generated by the curve generation function and extracting a curve meeting a predetermined condition from among the curves, wherein vectors A and B are two vectors going from the two passing points toward control points adjacent to the two passing points, and the second control point arrangement function rearranges the control points when a composite vector of the vectors A and B is within a first range compared with the vector A and when a distance between the control points adjacent to the two passing points is equal to or less than a first threshold value compared with a distance between each of the two passing points and its adjacent control point.

11. A non-transitory computer-accessible storage medium on which is recorded a program enabling a computer used to build a route curve generation system for generating a curve becoming a route of a deformable structure, which passes through two passing points generated by route design to execute functions, the functions comprising:

a control point arrangement function arranging control points needed to generate the curve, according to respective pieces of passing point information defined at two passing points;

a first curve generation function generating the curve between the two points while modifying arrangement of one or more control points, using arrangement of the control points by the control point arrangement functions as initial arrangement, wherein vectors A and B are two vectors going from the two passing points toward control points adjacent to the two passing points, and the first curve generation function modifies the arrangement of one or more control points when a composite vector of the vectors A and B is within a first range compared with the vector A and when a distance between the control points adjacent to the two passing points is equal to or less than a first threshold value compared with a distance between each of the two passing points and its adjacent control point;

a curve evaluation function evaluating curves generated by the first curve generation function and extracting two curves constituting a boundary in which whether or not the curve meets a constraint to be met is changed before and after the modification by one time of modification of arrangement of the one or more control points;

a second curve generation function generating a curve between the two passing points while modifying arrangement of the one or more control points within a range where the two curves can be obtained more finely than the previous modifying when the curve evaluation function extracts the two curves; and a curve selection function selecting an optimal curve between the two passing points from among curves generated by the second curve generation function.

* * * * *